United States Patent [19]

Konneker

[11] Patent Number: 4,864,313
[45] Date of Patent: Sep. 5, 1989

[54] VOTING METHOD OF LOCATING MOBILE OBJECTS

[76] Inventor: Lloyd K. Konneker, 635 Hearon Dr., Stone Mountain, Ga. 30088

[21] Appl. No.: 16,015

[22] Filed: Feb. 18, 1987

[51] Int. Cl.$^4$ ............................................. G01S 3/02
[52] U.S. Cl. .................................................... 342/457
[58] Field of Search ............... 342/457; 364/460, 449; 340/988, 825.49; 379/59

[56] References Cited

U.S. PATENT DOCUMENTS

| | | | |
|---|---|---|---|
| 1,885,023 | 10/1932 | Dieckmann | 342/447 |
| 3,439,320 | 4/1969 | Ward | 340/825.49 |
| 3,568,161 | 3/1971 | Kuickel | 342/457 |
| 3,662,267 | 5/1972 | Reed | 340/993 |
| 3,735,335 | 5/1973 | Kaplan et al. | 342/457 |
| 3,757,290 | 9/1973 | Ross et al. | 342/457 |
| 3,922,678 | 11/1975 | Frenkel | 342/457 |
| 4,112,421 | 9/1978 | Freeny, Jr. | 342/457 |
| 4,209,787 | 6/1980 | Freeny, Jr. | 342/457 |

*Primary Examiner*—Thomas H. Tarcza
*Assistant Examiner*—David Cain

[57] ABSTRACT

This invention relates to a system and method for locating mobile objects. The system includes many signposts positioned within a monitored area and many mobile objects. The monitored area is subdivided into subareas. Many signposts are positioned in each subarea. Each signpost transmits a vote signal having encoded therein a subarea code identifying the subarea that the signpost is positioned in. The mobile objects receive the vote signals and detect the subarea codes encoded therein. The location of a mobile object is determined to be one of these subareas having a maximum count of signposts that are positioned in that subarea and that are in range of the mobile object.

11 Claims, 5 Drawing Sheets

VOTING METHOD OF LOCATING MOBILE OBJECTS

TECHNICAL FIELD

The invention pertains to means for detecting and tracking a mobile object within a monitored area, and in particular to means that use many signposts positioned in each identified subarea of the monitored area and in which every signpost in an identified subarea is assigned the same identification code of said identified subarea, and in which the method of deciding the location of the mobile object includes counting the identification codes received by mobile objects from signposts in each subarea.

BACKGROUND OF THE INVENTION

It has long been considered desirable to determine the location of mobile vehicles and other mobile objects. One type of system for determining the location of mobile objects is known as a signpost, or proximity, system. In a signpost system, the location of a mobile object is determined by detecting that the mobile object is near a signpost whose position is known. A common method of detecting that a mobile object is near a signpost is for the signpost to broadcast a signal for the mobile object to receive. The signal can only be received by the mobile object in a broadcast pattern near the signpost.

In many signpost systems the signposts are so far apart that the broadcast patterns of the signposts do not overlap. Knickel in U.S. Pat. No. 3,568,161 teaches one such system. Non-overlapping signpost systems are limited. In such systems, there are gaps between signpost broadcast patterns. A mobile object in a gap between signposts cannot communicate with the signposts. Thus the location of a mobile object in a gap between signposts cannot be directly determined. Also, the situation where the mobile object receiver has failed cannot be distinguished from the situation where the mobile object is in a gap. Also, the signposts cannot serve as reliable repeaters for transmissions from mobile objects. Also, when such systems are being installed, signposts must be carefully placed and the transmitting power of the signposts adjusted so that the broadcast patterns do not overlap.

In other signpost systems, the broadcast patterns of the signposts do overlap. Frenkel in U.S. Pat. No. 3,922,678 teaches one such system. In such systems, each signpost broadcasts a signal that uniquely identifies the signpost. In such systems, the location of the mobile object is determined by detecting that the mobile object is receiving only a single signpost and also by detecting that the mobile object is receiving certain unique combinations of uniquely identified signposts. Such overlapping signpost systems are limited by the difficulty and expense of positioning and adjusting signposts during installation so that overlap areas correspond to predetermined geographic areas.

Most signpost systems are also limited by lack of redundancy. In most systems, if one signpost fails or if the broadcast pattern of a signpost changes, the location of the mobile object cannot always be determined accurately.

Many signpost systems use many communication channels and require frequent transmissions by signposts. It is desireable to minimize the number of communication channels and the number of transmissions by signposts.

SUMMARY OF THE INVENTION

The aforesaid problems have been solved in a system and method of locating mobile objects. The system includes many signposts positioned within a monitored area and many mobile objects. The monitored area is subdivided into subareas. The signposts are positioned in subareas so that there are substantially no points which are not in the broadcast pattern of a signpost. Thus there are no gaps between the broadcast patterns of signposts. Each signpost transmits a vote signal having encoded therein a subarea code identifying the subarea that the signpost is positioned in. Many signposts each transmitting the same subarea code may be positioned in each subarea. Thus redundancy is provided. The vote signals are received by the mobile objects. The mobile objects use the subarea codes encoded in the received vote signals to determine the location of the mobile object within the monitored area. The location of the mobile object is determined to be one of those subareas having a maximum count of signposts that are broadcasting the subarea code of that subarea and that are received by the mobile object.

DETAILED DESCRIPTION

Figure 1:
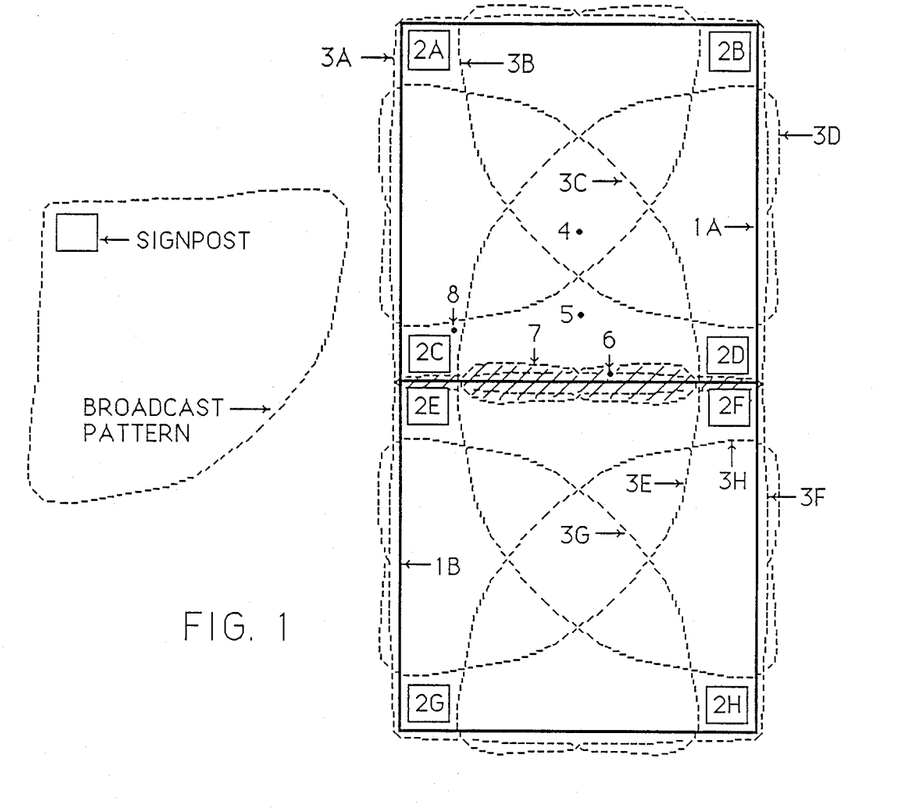
FIG. 1 is a map indicating the spacing and locations of signposts strategically located in a monitored area.

FIG. 1 shows a map indicating the spacing and locations of signposts strategically located in a monitored area. The map is subdivided into two subareas 1A and 1B. In FIG. 1 the boundaries of the subareas are in heavy lines. The positions of many signposts 2A through 2H are marked on the map. The broadcast pattern of each of the signposts are marked on the map by closed curves in dotted lines and are designated by a 3 and an alphabetic subscript the same as the alphabetic subscript of the signpost that transmits the broadcast pattern.

The positions of the signposts are chosen so that each point in each subarea is covered by the broadcast pattern of at least one signpost and so that the broadcast patterns of different subareas substantially do not overlap. In FIG. 1 this is accomplished by subdividing the monitored area into square subareas, by using signposts that broadcast patterns having roughly the shape of a quarter quadrant of a circle, and by positioning a signpost in each corner of each subarea with the signpost broadcast pattern emanating toward the center of the square subarea. In FIG. 1 the point 4 is only in the broadcast pattern of signposts 2A, 2B, 2C, and 2D that are in subarea 1A. Point 5 is only in the broadcast pattern of signposts 2C and 2D that are in subarea 1A. Point 6 is in the broadcast pattern of signposts 2C and 2D that are in subarea 1A but point 6 is also in the broadcast pattern of signposts 2E and 2F that are in subarea 1B. The locus 7 of points similar to point 6 is shown as a hatched area in FIG. 1. Locus 7 is an area in which the broadcast patterns of signposts that are in different subareas overlap. In FIG. 1 the area of the locus 7 is small in relation to the area of the subareas 1A and 1B. In FIG. 1 point 8 is only in the broadcast pattern of signpost 2C. In FIG. 1 the area of the locus of points that are only in the broadcast pattern of one signpost is small. In FIG. 1 there are no points in either subarea 1A or 1B that are not in the broadcast pattern of at least one signpost. The above-described arrangement is only one illustrative arrangement for dividing a monitored area into subareas and for positioning signposts.

Each subarea of the monitored area is assigned a unique subarea code that identifies the subarea. The signposts within a subarea broadcast the subarea code of said subarea. In FIG. 1, signposts 2A through 2D are assigned the unique code corresponding to the subarea 1A and signposts 2E through 2H are assigned the unique code corresponding to the subarea 1B.

Figure 2:
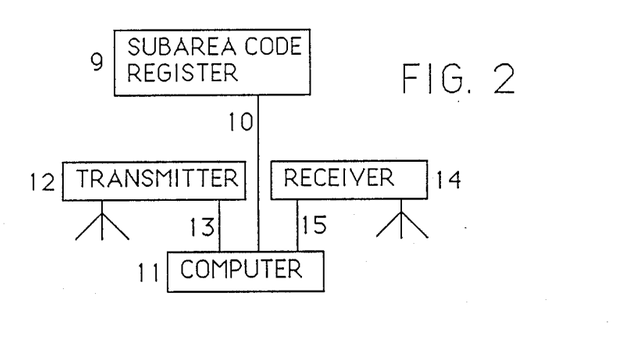
FIG. 2 shows a block diagram of a signpost.

FIG. 2 shows in block diagram form a signpost. A subarea code register 9 stores the subarea code corresponding to the subarea in which the signpost is positioned. Subarea code register 9 is coupled through the circuit conductor 10 to an input of computer 11. Receiver 14 is coupled through the circuit conductor 15 to another input of computer 11. Receiver 14 may receive polling signals transmitted by the mobile objects. The receiver 14 demodulates the received polling signals and provides a signal on circuit conductor 15 in response to a received polling signal. An output of computer 11 is coupled through the circuit conductor 13 to a control input of transmitter 12. The computer 11 provides a signal, with the subarea code encoded therein, on circuit conductor 13. In response, the transmitter 12 transmits a vote signal and modulates the vote signal with the subarea code.

Figure 3:
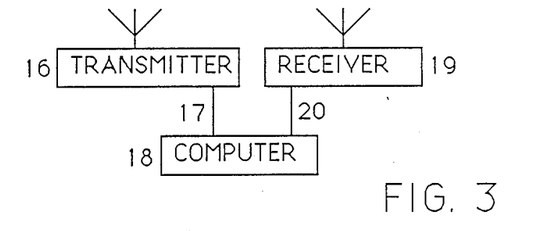
FIG. 3 shows a block diagram of a mobile object.

FIG. 3 shows in block diagram form a mobile object. Receiver 19 is coupled via circuit conductor 20 to an input of computer 18. Receiver 19 receives the vote signals transmitted by signposts. The receiver 19 demodulates the received vote signals and provides a signal on circuit conductor 20 in response to a received vote signal. An output of computer 18 is coupled through the circuit conductor 17 to a control input of transmitter 16. The computer 18 provides a signal on circuit conductor 17. In response, the transmitter 16 transmits a polling signal. Transmitters 12 and 16, receivers 14 and 19, and computers 11 and 18 are well known in the art. Computers 11 and 18 are each equipped with a central processing unit, memory, and a timer.

Figure 4:
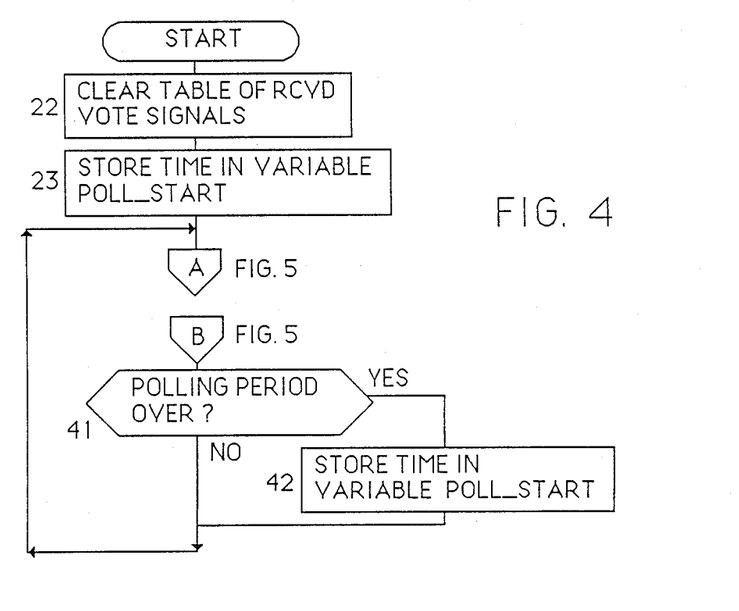
FIG. 4 and FIG. 5 show a flowchart of a first embodiment of a mobile object locating program executed at the mobile object shown in FIG. 3.
Figure 5:
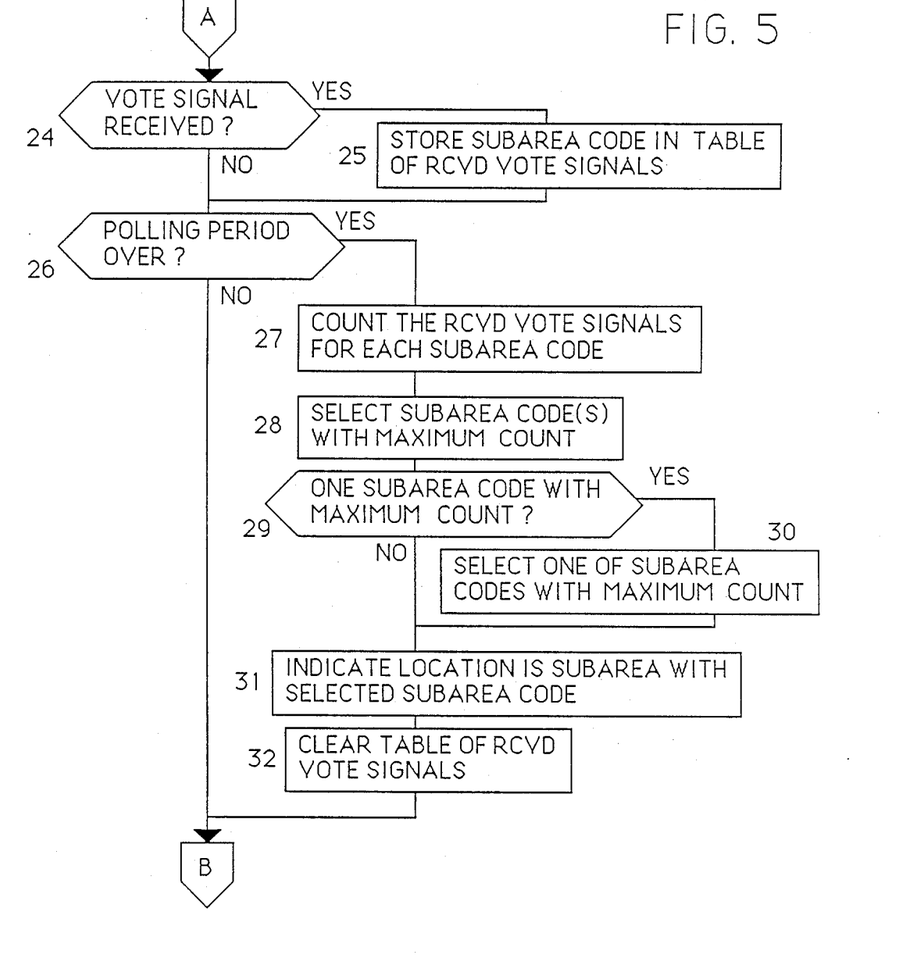

A program executes on computer 18 of each mobile object. FIG. 4 and FIG. 5 show the flowchart of the program for a first embodiment of the method. Program execution begins at program address START in FIG. 4. A table of received vote signals is kept in the memory of the computer 18. At 22, the program clears the table of received vote signals. Next, at 23 the program stores the time of day in variable POLL_START. Next the program enters a never-ending loop at step 24 in FIG. 5. At 24 the program examines the signal from the receiver 19 to determine whether a vote signal has been received. If a vote signal has not been received then the program goes to 26. If a vote signal has been received then the program goes to 25. At 25 the program stores the subarea code from the received vote signal in the table of received vote signals and goes to 26. At 26, the program determines whether a polling period is over by subtracting the contents of variable POLL_START from the time of day and comparing the result to a predetermined polling period duration, denoted by POLL_TIME. If a polling period is not over, then the program goes to step 41 in FIG. 4.

If at 26 the polling period is over, the program goes to 27. At 27, the program examines the contents of the table of received vote signals to count received vote signals having the same subarea code. Next, at 28 the program selects the set of subarea codes having the maximum count of received vote signals. At 29 the program determines whether said set of subarea codes has one member or many members. If said set has one member, then the program goes to 31. If said set has many members, then the program goes to 30. At 30 the program selects one member of said set and goes to 31. When the program reaches step 31 the program has determined that the location of the mobile object is the subarea corresponding to the one selected subarea code. At 31, the program indicates said one selected subarea code to means for utilizing the location of the mobile object. Next, at 32 the program clears the table of received vote signals and goes to step 41 in FIG. 4.

At 41, the program determines whether at the most recent execution at step 26 the program determined the polling period to be over. If so, the program goes to 42. At 42 the program stores the time in variable POLL_START. Step 42 marks the start of a new polling period. From 42 the program loops to 24 in FIG. 5. If the test at 41 fails, the program loops to 24 in FIG. 5.

Figure 6:
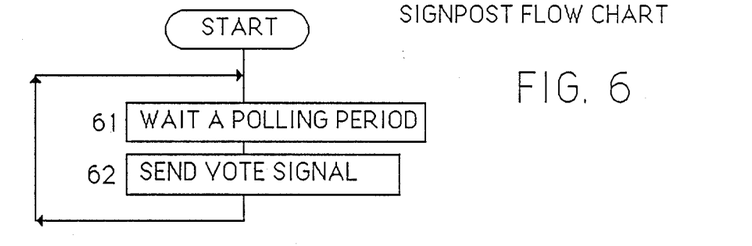
FIG. 6 shows a flowchart of a first embodiment of a mobile object locating program executed at the signpost shown in FIG. 2.

A program executes on the computer 11 of each signpost. FIG. 6 shows the flowchart of the program for the first embodiment of the method. Program execution begins at program address START in FIG. 6. The program comprises a never-ending loop. At 61 the program waits a time equal to POLL_TIME. After the wait is over, at 62 the program sends a signal to the transmitter 12 to cause it to transmit a vote signal. Next, the program loops to 61.

In the first embodiment, the receiver 14 of the signpost and the transmitter 16 of the mobile object are not used.

With reference to FIG. 1, FIG. 4, FIG. 5, and FIG. 6 the first embodiment of the method is described by assuming that a mobile object is at location 5 in FIG. 1. We assume that the time is 9655 ticks and that the program of the mobile object next executes the step at 42 in FIG. 4, storing the value 9655 in variable POLL_START. The program next executes the step at 24 in FIG. 5. We assume that no signpost has transmitted since the most recent time the program executed at 24. Hence the program goes to 26. Since in this example, the polling period has just started, at 26 the test fails and the program goes to 41 in FIG. 4. At 41 the test fails and the program goes to 24 in FIG. 5. We assume that now signpost 2C transmits a vote signal. We assume that the subarea code for subarea 1A is X and that the subarea code for subarea 1B is Y. The vote signal transmitted by signpost 2C is encoded with subarea code X. The mobile object receives the transmission and demodulates the encoded subarea code X. Next at 24 the program determines that a vote signal has been received and goes to 25 where the program stores the subarea code X in the table of received vote signals. Next the test at 26 again fails and the program goes to 41. At 41 the test fails and the program goes to 24. We assume that now signpost 2D transmits a vote signal, also encoded with subarea code X, and that the mobile object receives the transmission and demodulates the encoded subarea code X. Next at 24 the program determines that a vote signal has been received and goes to 25 where the program stores the subarea code in the table of received vote signals. Next the test at 26 again fails and the program goes to 41. At 41 the test fails and the program goes to 24. We assume that now signpost 2E transmits a vote signal, encoded with subarea code Y. The signpost 2E is not in range of the mobile object and so the test at 24 fails. Next the test at 26 again fails and the program goes to 41. At 41 the test fails and the program goes to 24. We assume that in succession signposts 2F, 2A, 2B, 2G, and 2H all transmit their vote signal. Since none of signposts 2F, 2A, 2B, 2G, and 2H is in range of the mobile object, the test at 24 fails.

We assume that the program executes several more iterations through the loop comprising steps 24, 26, and 41. We assume that POLL_TIME is 100 ticks and that the time has advanced to 9755. At 26 the program subtracts 9655 from 9755 and compares the result to POLL_TIME. The test at 26 succeeds and the program goes to 27. At 27 the program examines the contents of the table of received vote signals. The program determines that the count of vote signals for subarea code X is two and that the count for all other subarea codes is zero. At 28 the program selects subarea code X as a subarea code with the maximum count of received vote signals. Here the maximum count is two. At 29 the program determines that subarea code X is the only subarea code with count equal to the maximum count. The program goes to 31 and indicates subarea code X as the location of the mobile object. Next, at 32, the program clears the table of received vote signals. Next the test at 41 succeeds and the program goes to 42. We assume that the time is now 9756. At 42 the program stores the value 9756 in variable POLL_START.

We assume that now the mobile object moves to point 6 in FIG. 1. The program next goes to step 24. We assume that now signpost 2C again transmits a vote signal. Note that since each of the signposts waits the same POLL_TIME, the order in which the signposts transmit for the second time in this example will be the same as the order they transmitted for the first time in this example. The mobile object receives the vote signal transmitted by signpost 2C and demodulates the encoded subarea code X. Next, at 24, the program determines that a vote signal has been received and goes to 25. At 25 the program stores the subarea code X in the table of received vote signals. Next the test at 26 again fails and the program goes to 41. At 41 the test fails and the program goes to 24. Now signpost 2D transmits a vote signal, also encoded with subarea code X. The mobile object receives the transmission and demodulates the encoded subarea code X. Next, at 24 the program determines that a vote signal has been received and goes to 25 where the program stores the subarea code X in the table of received vote signals. Next the test at 26 again fails and the program goes to 41. At 41 the test fails and the program goes to 24.

Now signpost 2E transmits a vote signal, encoded with subarea code Y. Now the signpost 2E is in range of the mobile object. The mobile object receives the transmission and demodulates the encoded subarea code Y. Next at 24 the program determines that a vote signal has been received and goes to 25 where the program stores the subarea code Y in the table of received vote signals. Next the test at 26 again fails and the program goes to 41. At 41 the test fails and the program goes to 24. Now signpost 2F transmits a vote signal, encoded with subarea code Y. Now the signpost 2F is in range of the mobile object. The mobile object receives the transmission and demodulates the encoded subarea code Y. Next at 24 the program determines that a vote signal has been received and goes to 25 where the program stores the subarea code Y in the table of received vote signals. Next the test at 26 again fails and the program goes to 41. At 41 the test fails and the program goes to 24. In succession signposts 2A, 2B, 2G, and 2H all transmit their vote signal. Since none of signposts 2A, 2B, 2G, and 2H is in range of the mobile object, the test at 24 fails.

We assume that the program executes several more iterations through the loop comprising 24, 26, and 41. We assume that the time has advanced to 9856. The test at 26 succeeds and the program goes to 27. At 27 the program examines the contents of the table of received vote signals. The program determines that subarea code X has count equal to two and that subarea code Y also has count equal to two. At 28 the program selects both subarea code X and subarea code Y as subarea codes with the maximum count of received vote signals. Here the maximum count is two. At 29 the program determines that there is more than one subarea code with count equal to the maximum count. The program goes to 30 and selects one of the subarea codes with the maximum count. Here we assume that subarea code Y is selected. Next the program goes to 31 and indicates subarea code Y as the location of the mobile object. Next, at 32, the program clears the table of received vote signals. We assume that the time is now 9858. Next the test at 41 succeeds and the program goes to 42. At 42 the program stores the value 9858 in variable POLL_START. The program continues to execute as in the example described above.

In preferred embodiments, the signposts and mobile objects all share the same communication channel and the signposts transmit only after determining that no other signpost is transmitting at the same time. This so-called carrier sense multiple access (CSMA) protocol for channel sharing is well known. In the CSMA protocol, concurrent transmissions by two signposts might collide, causing neither transmission to be received by some receiver. In the CSMA protocol, the load on the communication channel must be kept low to reduce collisions. One advantage to suing the CSMA protocol is that the cost is low since transmitters and receivers need only provide one channel. The arrangement whereby a single channel is shared using the CSMA protocol is only one illustrative arrangement for insuring that the vote signals are with high probability received by mobile objects that are in range.

In preferred embodiments, the signposts are not synchronized with a global clock, yet the order in which signposts transmit will be substantially the same over long periods of time and will only vary depending on inaccuracy of the timers in the signpost computers.

In preferred embodiments of the method, at step 30 in FIG. 5, if one of the set of subarea codes is the same as the subarea code of the location that was determined the most recent time the location of the mobile object was determined, the program selects said one subarea code.

In the first embodiment, the signposts transmit vote signals to mobile objects. In another arrangement, a mobile object transmits an identifying signal to signposts, which then relay the identifying signals to a central unit. The central unit then decides the location of the mobile object in a similar manner as a mobile object does in the first embodiment. The advantage of the first embodiment is that no relay of signals is required, which saves interconnecting signposts. The first embodiment is known as a direct proximity system. The arrangement whereby mobile objects transmit an identifying signal to signposts is known as an inverse proximity system. The duality between direct and inverse proximity methods is well known.

In the first embodiment, the period between transmittals of vote signals by a signpost and the POLL_TIME of a mobile object are the same. Thus in every polling period of a mobile object, each signpost will always transmit a vote signal exactly once. Thus the vote signals received by a mobile object during a polling period will correspond one-to-one with signposts in range of the mobile object. This is true no matter how many mobile objects are in range of any signpost.

In a second embodiment each signpost transmits a vote signal only in response to a polling signal transmitted by a mobile object, and a mobile object only counts those vote signals received within one POLL_TIME after the mobile object transmits a polling signal. In the second embodiment steps are taken by signposts to insure that a signpost does not transmit a vote signal twice during the polling period of any mobile object, when the signpost is simultaneously in range of many mobile objects each sending a polling signal.

Figure 7:
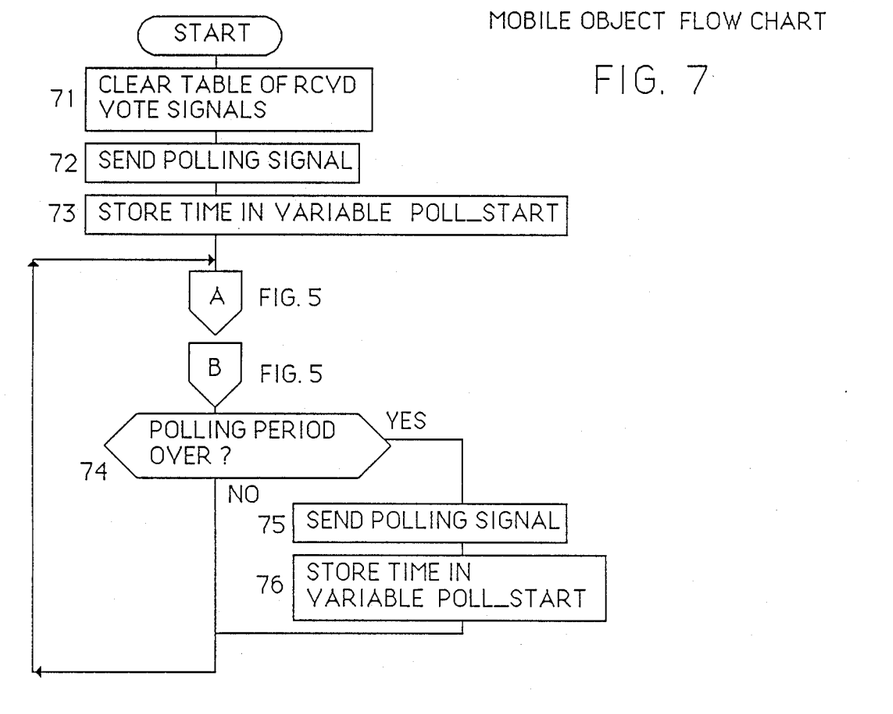
FIG. 7 shows a flowchart of a second embodiment of a mobile object locating program executed at the mobile object shown in FIG. 3.

FIG. 7 shows the flowchart of the program executed at the computer 18 of each mobile object for the second embodiment of the method. Program execution begins at program address START in FIG. 7. As in the first embodiment, a table of received vote signals is kept in the memory of the computer 18. At 71 the program clears the table of received vote signals. Next, at 72 the program sends a signal to the transmitter 16 causing it to transmit a polling signal. A polling signal marks the start of a polling period. Next, at 73 the program stores the time of day in variable POLL_START. Next the program enters a never-ending loop. FIG. 5 shows the first part of the loop. The first part of the loop is the same as for the first embodiment. The second part of the loop for the second embodiment begins at 74 in FIG. 7. At 74, the program determines whether at the most recent execution at step 26 the program determined the polling period to be over. If so, the program goes to 75 and sends a signal to the transmitter 16 to cause it to transmit a polling signal. At 76 the program stores the time in variable POLL_START and loops to 24 in FIG. 5. If the test at 74 fails, the program loops to 24 in FIG. 5.

Figure 8:
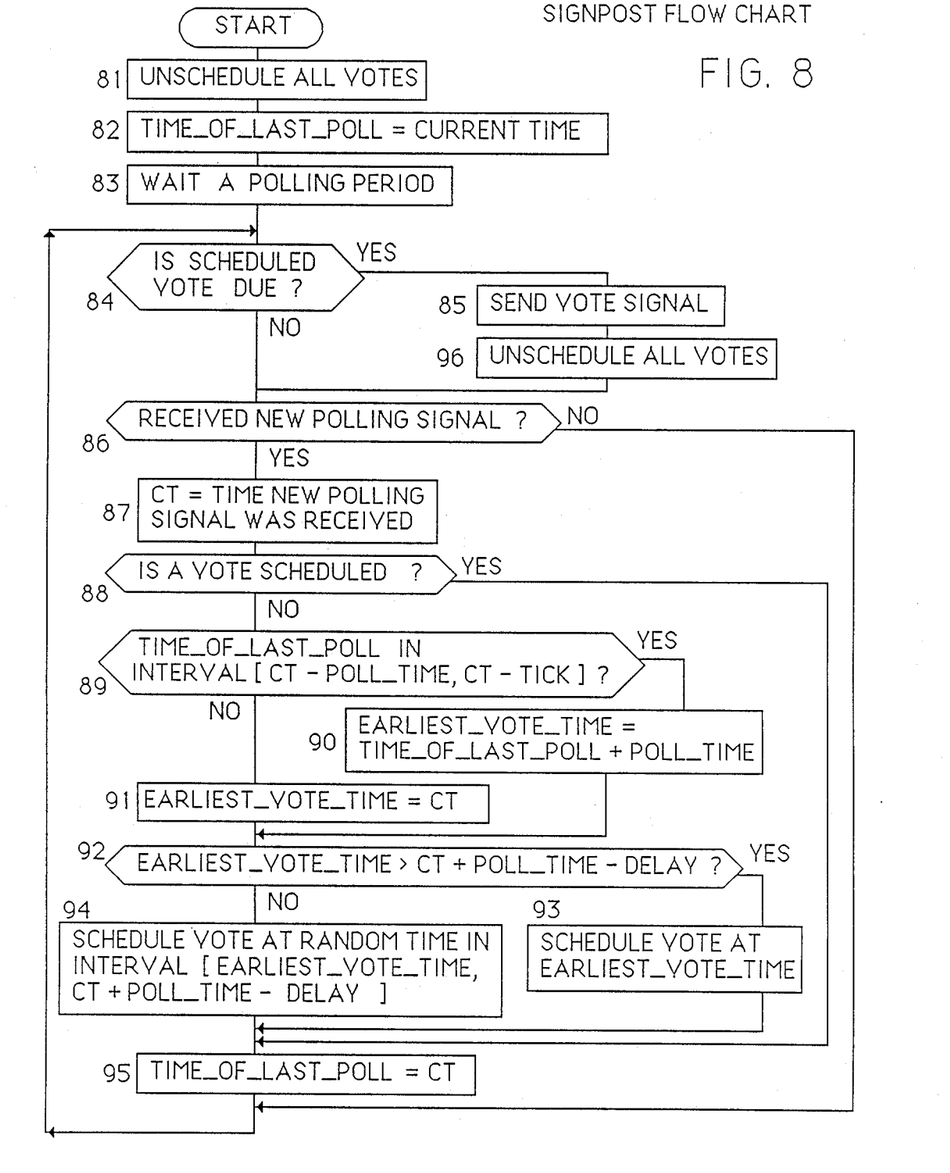
FIG. 8 shows a flowchart of a second embodiment of a mobile object locating program executed at the signpost shown in FIG. 2.

FIG. 8 shows the flowchart of the program executed at the computer 11 of each signpost for the second embodiment of the method. Program execution begins at program address START in FIG. 8. At 81 the program initializes data structures to show that no votes are scheduled. Next, at 82, the program stores the time of day in variable TIME_OF_LAST_POLL. Next, at 83, the program waits a period equal to POLL_TIME. The steps 81, 82, and 83 serve to initialize the program to a known state. Next, at 84, the program enters a never-ending loop. At 84 the program tests whether it is time for a vote signal to be sent. If the test at 84 succeeds the program goes to 85. At 85 the program sends a signal having encoded therein the subarea code of the signpost to the transmitter 12 to cause it to transmit a vote signal. Next, at 96, the program unschedules all votes, including the vote that just came due, and goes to 86. If the test at 84 fails the program goes to 86.

At 86, the program tests whether the signpost has received a recent polling signal from a first mobile object since the most recent execution of step 86. If the test at 86 fails the program goes to 84 and continues the never-ending loop. If the test at 86 succeeds the program goes to 87. At 87 the program stores the time that the polling signal was received in variable CT. Next, at 88 the program determines whether the program has previously scheduled a vote signal for some time still in the future. If so, then the program goes to 95. If the test at 88 succeeds, then it is known that some other mobile object in range of the signpost is polling, as well as the first mobile object whose polling signal was just received. It is also known that said scheduled vote signal was originally scheduled to fall in the polling period of said other mobile object, but also falls in the polling period of the first mobile object whose polling signal was just received. Thus it is known that the program's responsibility to send a vote signal within both the polling period of said other mobile object and the polling period of the mobile object whose polling signal was just received will be satisfied by the single said scheduled vote signal. If the test at 88 fails the program goes to 89.

At 89 the program determines whether an other polling signal from an other mobile object was received within the interval that starts at the time of receipt of the recent polling signal less POLL_TIME and that ends one clock tick before the time of receipt of said recent polling signal. If the test at 89 fails the program goes to 91. In this case, the program knows that only one mobile object in range is polling and that the program can therefore send a next vote signal as soon as possible with little chance of said next vote signal being received in the polling period of an other mobile object that has already received a previous vote signal from the same signpost in the same polling period of said other mobile object. At 91 the program stores the time of receipt of the recent polling signal in variable EARLIEST_VOTE_TIME. From 91 the program goes to 92.

If at 89 the program determines that some other polling signal was received in said interval, then the program goes to 90. At 90 the program stores a value that is one POLL_TIME later than the time of receipt of said other polling signal in variable EARLIEST_VOTE_TIME. In this case, the program knows that one other mobile object, in addition to the first mobile object whose polling signal was just received, is in range of the signpost and is polling, that the program must have already transmitted a previous vote signal that fell in the polling period of said other mobile object, and that the program can therefore send a next vote signal only after the polling period of said other mobile object is over. From 90 the program goes to 92.

At 92 the program determines whether the value of variable EARLIEST_VOTE_TIME is greater than a time POLL_TIME after the time of receipt of the recent polling signal less DELAY. DELAY is the sum of the expected delay from the time a vote signal is ready to be transmitted until the time the vote signal can actually be started to be transmitted, plus the time from the start of transmitting a vote signal to the end of transmitting a vote signal. Said expected delay exists when a single communication channel is shared and there is contention for the communication channel. A vote signal must be sent at least DELAY time before the end of any polling period of a mobile object to which said vote signal is a response so that the vote signal will, with high probability, be received by said mobile object before the end of said polling period.

If the test at 92 succeeds the program goes to 93. At 93 the program schedules a next vote signal at a future time equal to the value of variable EARLIEST_VOTE_TIME. In this case, it is known that said next vote signal can not be received by said other mobile object within the polling period of said other mobile object and therefore said next vote signal will not be the second vote signal that was sent by the signpost and received by said other mobile object within the same polling period of said other mobile object. It is also known that sufficient time remains until the end of the polling period of said first mobile object for said next vote signal to be received by said first mobile object within the polling period of said first mobile object, if there were no other signals contending for the communication channel. But it is also known that it is likely that said next vote signal will not be received by said first mobile object by the end of the polling period of said first mobile object because of contention for the communication channel. From step 93 the program goes to step 95.

If the test at 92 fails the program goes to 94. At 94 the program schedules a next vote signal at a future time chosen randomly from the interval that starts at the time in variable EARLIEST_VOTE_TIME and that ends one POLL_TIME after the time of receipt of the recent polling signal less DELAY. In this case, it is known that it is likely that said next vote signal will be received by said first mobile object before the end of the polling period of said first mobile object. From 94 the program goes to 95.

At 95 the program stores the time of receipt of the recent polling signal in variable TIME_OF_LAST_POLL. The time of receipt of the recent polling signal is needed so that when a subsequent polling signal is received, the program can determine at step 89 whether said subsequent polling signal was received within the polling period of said first mobile object which sent said recent polling signal. From 95 the program goes to 84 and continues the never-ending loop.

With reference to FIG. 1, FIG. 5, FIG. 7, and FIG. 8, the second embodiment of the method is described by assuming that a mobile object X has just entered the monitored area and is now at location 8 in FIG. 1. We also assume that no other mobile object is now or ever has been in the monitored area. Thus no signposts have transmitted a vote signal since a time longer than a POLL_TIME ago. We assume POLL_TIME to be 100 ticks. We assume the program of mobile object X has just completed the step at 32 in FIG. 5. The program next executes the step at 74 in FIG. 7. Since a polling period has just been completed, the test at 74 succeeds and at 75 the program transmits a polling signal. We assume that the time is 9665. At 76 the program next stores the value 9665 in variable POLL_START.

We assume that only signpost 2C is in range of mobile object X. With reference now to FIG. 8, we describe the steps taken by the program at signpost 2C. We assume the program of the signpost 2C is just about to start the step at 86 in FIG. 8. We assume that the time is now 9666 and that variable TIME_OF_LAST_POLL contains the value 8998, which shows that no mobile object has recently been near the signpost 2C. Next, the signpost program executes at 86. We assume that the signpost has received the polling signal that the mobile object X has just transmitted, so the program goes to 87. At 87 the program puts the value 9666 in variable CT. At 88 the program determines that no vote signals are scheduled and goes to 89. In this case, at 89 the program determines that the value of TIME_OF_LAST_POLL, 8998, is not in the interval [9566, 9665]. This means that another polling signal was not heard after a time one POLL_TIME before the receipt of the recent polling signal. Thus the program goes to 91. At 91 the program stores the value 9666 in variable EARLIEST_VOTE_TIME and goes to 92. We assume that DELAY is 10 ticks. At 92 the program determines that 9666 is not greater than 9756 and goes to 94.

At 94 the program chooses a random time in the interval [9666, 9756]. We assume that the program chooses the time 9700. Also at 94, the program schedules a vote for the chosen time 9700. The program goes to 95 where it sets variable TIME_OF_LAST_POLL to the value 9666. The program goes to 84. We assume that the time is now 9667. At 84, the program finds that a scheduled vote is not due. Thus the program goes to 86. Since we assume that no other mobile objects are in the monitored area, at 86 the program finds that no new polling signal has been received since the one received at time 9666. Thus the program goes to 84. We assume that the program continues to take the path 84, 86, 84, 86, and so on while time ticks off. At time 9700 and at step 84, the program determines that the vote scheduled for time 9700 is now due. Thus the program goes to 85, where the program transmits a vote signal. At 96, the program unschedules the vote that was scheduled for time 9700 and goes to 86 and then to 84. At step 84 the program determines that no vote is scheduled. Thus the program goes to 86.

We now describe the steps taken by the program at mobile object X. We assume that in the time since the program sent the polling signal at step 75, the program has continually executed the path 24, 26, 74, 24, 26, 74 and so on (not finding the polling period over and not receiving vote signals) and is now just about to start the step at 24 in FIG. 5. We assume that the time is now 9702. At 24, the program determines that a vote signal (the one sent by signpost 2C at time 9700) was received. Thus at 25 the program stores the demodulated signpost code in the table of received vote signals. Next, the program goes to 26, where the program determines that the polling period is not over. Since there are no other signposts in range, the program continually executes the path 24, 26, 74, 24, 26, 74 (not finding the polling period over and not receiving vote signals) until the time 9766, at which time the program executes step 26, determines the polling period to be over, and goes to 27. Beginning at 27, the program determines the location of the mobile object as described previously.

After the program determines the location of the mobile object the program reaches step 74 in FIG. 7. Since a polling period has just been completed, at 75 the program next transmits a polling signal. We assume that the time is now 9767. At 76 the program stores the value 9767 in variable POLL_START.

We now describe the steps taken by the program at signpost 2C. We assume that the time is now 9767. Since the signpost voted at time 9700 it has been executing the path 84, 86, 84, 86, and so on. We assume the program now executes at 86. We assume that the signpost has received the polling signal that the mobile object X has just transmitted, so the program goes to 87. At 87 the program puts the value 9767 in variable CT. At 88 the program determines that no vote signals are scheduled and goes to 89. In this case, at 89 the program determines that the value of TIME_OF_LAST_POLL, 9666, is not in the interval [9667, 9766]. This means that another polling signal was not heard after a time one POLL_TIME before the receipt of the recent polling signal. Thus the program goes to 91. At 91 the program stores the value 9767 in variable EARLIEST_VOTE_TIME. At 92 the program determines that 9767 is not greater than 9857 and goes to 94. At 94 the program chooses a random time in the interval [9767, 9857]. We assume that the program chooses the time 9800. Also at 94, the program schedules a vote for the chosen time 9800. The program goes to 95 where it sets variable TIME_OF_LAST_POLL to the value 9767. The program goes to 84. We assume that the time is now 9768. At 84, the program finds that a scheduled vote is not due. Thus the program goes to 86. At 86 the program finds that no new polling signal has been received since the one received at time 9767. Thus the program goes to 84. We assume that the program continues to take the path 84, 86, 84, 86, and so on while time ticks off.

We assume that now a second mobile object Y moves into the monitored area to location 8 in FIG. 1. We assume that at time 9790 at step 75, the mobile object Y begins a polling period by transmitting a polling signal. We assume that the time is now 9791. At 76 the program stores the value 9791 in variable POLL_START.

We now describe the steps taken by the program at signpost 2C. We assume that the time is now 9791. We assume the program now executes at 86. We assume that the signpost has received the polling signal that the mobile object Y has just transmitted, so the program goes to 87. At 87 the program determines that a vote signal is scheduled and goes to 95. At 95 the program sets variable TIME_OF_LAST_POLL to the value 9791. The program goes to 84. We assume that the time is now 9792. At 84, the program finds that a scheduled vote is not due. Thus the program goes to 86. At 86 the program finds that no new polling signal has been received since the one received at time 9791 from mobile object Y. Thus the program goes to 84. We assume that the program continues to take the path 84, 86, 84, 86, and so on while time ticks off.

At time 9800 and at step 84, the program at signpost 2C determines that the vote scheduled for time 9800 is now due. Thus at 85 the program transmits a vote signal. At 96, the program unschedules the vote that was scheduled for time 9800 and goes to 86 and then to 84. At step 84 the program determines that no vote is scheduled. Thus the program goes to 86.

We assume that now a third mobile object Z moves into the monitored area at location 8 in FIG. 1. We assume that at time 9811 an step 75, the mobile object Y begins its polling period by transmitting a polling signal. We assume that the time is now 9812. At 76 the program stores the value 9812 in variable POLL_START.

We now describe the steps taken by the program at signpost 2C. We assume that the time is now 9812. We assume the program now executes at 86. We assume that the signpost has received the polling signal that the mobile object Z has just transmitted, so the program goes to 87. At 87 the program puts the value 9812 in variable CT and goes to 88. At 88 the program determines that no vote signals are scheduled and goes to 89. In this case, at 89 the program determines that the value of TIME_OF_LAST_POLL, 9791, is in the interval [9712,9811]. This means that an other polling signal, the one from mobile object Y, was heard after a time one POLL_TIME before the receipt of the recent polling signal from mobile object Z. Thus the program goes to 90. At 90 the program stores the value 9891 in variable EARLIEST_VOTE_TIME and goes to 92. At 92 the program determines that 9891 is not greater than 9902 and goes to 94. At 94 the program chooses a random time in the interval [9891,9902]. We assume that the program chooses the time 9894. Also at 94, the program schedules a vote for the chosen time 9894. The program goes to 95 where it sets variable TIME_OF_LAST_POLL to the value 9812. The program goes to 84. We assume that the time is now 9813. At 84, the program finds that a scheduled vote is not due. Thus the program goes to 86. At 86 the program finds that no new polling signal has been received since the one received at time 9812. Thus the program goes to 84. We assume that the program continues to take the path 84, 86, 84, 86, and so on while time ticks off.

We now describe the steps taken by the program at mobile object X. In the time since the program of the mobile object X sent the polling signal at time 9767, the program has received the vote signal sent by signpost 2C at time 9800. At time 9867 the program executes step 26, determines the polling period to be over, and determines the location of the mobile object as described previously. We assume that before mobile object X transmits another polling signal, mobile object X moves out of the monitored area.

We now describe the steps taken by the program at mobile object Y. In the time since the program of the mobile object Y sent the polling signal at time 9791, the program has received the vote signal sent by signpost 2C at time 9800. At time 9891 the program executes step 26, determines the polling period to be over, and goes to 27. Beginning at 27, the program determines the location of the mobile object as described previously. Since a polling period has just been completed, at 75 the program transmits a polling signal. We assume that the time is now 9892. At 76 the program stores the value 9892 in variable POLL_START.

When mobile object Y transmits a polling signal, at time 9892 signpost 2C receives the polling signal but at step 88 the signpost determines that a vote is scheduled for time 9894 that will fall in the polling period of mobile object Y, as described previously.

At time 9894 and at step 84, the program at signpost 2C determines that the vote scheduled for time 9894 is now due. Thus at 85 the program transmits a vote signal. At 96, the program unschedules all votes and goes to 86 and then to 84. At step 84 the program determines that no vote is due. Thus the program goes to 86. We assume that the program continues to take the path 84, 86, 84, 86, and so on while time ticks off.

We assume that now a fourth mobile object W moves into the monitored area at location 8 in FIG. 1. We assume that at time 9895 and at step 75, the mobile object W begins its polling period by transmitting a polling signal. We assume that the time is now 9896. At 76 the program stores the value 9896 in variable POLL_START.

We now describe the steps taken by the program at signpost 2C. We assume that the time is now 9896. We assume the program of the signpost 2C next executes at 86. We assume that the signpost has received the polling signal that the mobile object W has just transmitted, so the program goes to 87. At 87 the program puts the value 9896 in variable CT and goes to 88. At 88 the program determines that no vote signals are scheduled and goes to 89. In this case, at 89 the program determines that the value of TIME_OF_LAST_POLL, 9892, is in the interval [9796,9895]. This means that an other polling signal, the one from mobile object Y, was heard after a time POLL_TIME before the receipt of the recent polling signal from mobile object W. Thus the program goes to 90. At 90 the program stores the value 9992 in variable EARLIEST_VOTE_TIME and goes to 92. At 92 the program determines that 9992 is greater than 9986 and goes to 93. At 93 the program schedules a vote for the time 9992. The program goes to 93 where it sets variable TIME_OF_LAST_POLL to the value 9896. The program goes to 84. We assume that the time is now 9897. At 84, the program finds that a scheduled vote is not due. Thus the program goes to 86. At 86 the program finds that no new polling signal has been received since the one received at time 9896. Thus the program goes to 84. We assume that the program goes to take the path 84, 86, 84, 86, and so on while time ticks off.

Now we describe the steps taken by the program at mobile object Z. In the time since the program of the mobile object Z sent the polling signal at time 9812, the program has received the vote signal sent by signpost 2C at time 9894. At time 9912 the program executes step 26, determines the polling period to be over, and determines the location of the mobile object as described previously. We assume that before mobile object Z transmits another polling signal, mobile object Z moves out of the monitored area.

Now we describe the steps taken by the program at mobile object Y. In the time since the program of the mobile object Y sent the polling signal at time 9892, the program has received the vote signal sent by signpost 2C at time 9894. At time 9992 the program executes step 26, determines the polling period to be over, and determines the location of the mobile object as described previously. We assume that before mobile object Y transmits another polling signal, mobile object Y moves out of the monitored area.

At time 9992 and at step 84, the program at signpost 2C determines that the vote scheduled for time 9992 is now due. Thus at 85 the program transmits a vote signal. Note that said vote signal could not be received by mobile object Y within the polling period of mobile object Y that just ended.

Now we describe the steps taken by the program at mobile object W. At time 9993 the program executes step 86, determines that a polling signal was received, and stores the encoded subarea code in the table of received vote signals as described previously. In this case, the vote signal at time 9992 was received by mobile object W just before the end of the polling period of mobile object W. Sometimes it would not be. This ends the example of the method.

In the second embodiment, at 94 the signpost program randomly chooses a time to transmit a vote signal. The time is chosen at random so that the load on the shared channel is uniformly distributed over time. It is known that a channel that is shared using the CSMA protocol suffers a decrease in throughput if the load is too much. If the time were not chosen at random, but say to be the earliest possible time after the receipt of the polling signal, then the load on the communication channel at said earliest possible time would be great, and the communication channel might become overloaded.

In the second embodiment, the mobile object polls at regular intervals. In another arrangement, the mobile object polls only when the location of the mobile object is needed, thereby saving channel capacity and signpost power.

In the second embodiment, DELAY is a constant that is calculated once. In an alternate arrangement, DELAY may be recalculated as the load on the communication channel varys.

In the second embodiment, a vote signal or polling signal might be lost because of channel collisions. In the second embodiment, the transmittal of a scheduled vote signal might be delayed beyond the end of a polling period that the vote signal was intended to fall in, because of more channel contention than allowed for by DELAY. Both the loss of signals and the delay of signals might cause a mobile object to incorrectly determine its location. The likelihood of a mobile object incorrectly determining its location depends on the load on the channel and the number of signposts each transmitting the same subarea code.

The second embodiment is only one arrangement for insuring that the vote signals counted by a mobile object are in one-to-one correspondence with signposts in range of the mobile object, when signposts send vote signals in response to polling signals and when many mobile objects are simultaneously polling in range of a signpost. In another arrangement, the signposts encode a unique signpost identifier in the vote signal in addition to the subarea code, and the mobile object eliminates duplicate vote signals from the same signpost by examining said identifiers. The disadvantage of such an arrangement is that the signposts transmit more often than in the second embodiment, thereby wasting channel capacity and signpost power.

When it is known that a signpost will never be simultaneously in range of many polling mobile objects, an alternate signpost program may be used in the second embodiment. In such an alternate signpost program, a signpost always transmits a vote signal in response to a polling signal.

In both embodiments of the method, the polling period of the mobile object must be short so that the location of the mobile object does not substantially change during the polling period. In the method, if the communication channel is shared, the polling period must be long enough for each signpost in range of the mobile object to with high probability successfully transmit a vote signal to the mobile object.

It is to be understood that the above-described arrangements are merely illustrative of the application of the principles of the invention and that numerous other arrangements may be devised by those skilled in the art without departing from the spirit and scope of the invention.

I claim:

1. A method of determining a location of a mobile object within a monitored area using many signposts positioned in subareas of the monitored area wherein signposts are capable of communicating with the mobile object, and wherein each signpost transmits a coded signal identifying the subarea that the signpost is positioned in, and wherein at least two signposts are positioned in a same subarea and transmit a same coded signal identifying the same subarea, the method comprising the steps of:

determining which signposts are in range of the mobile object;

for each subarea, counting a number of signposts that transmit the coded signal identifying said subarea and that are in range of the mobile object, wherein said counting is capable of determining a total greater than one; and determining the location of the mobile object as being within one of said subareas having a said number of signposts greater than or equal to said number for any other subarea.

2. The method of claim 1 in which the step of determining which signposts are in range of the mobile object further comprises the steps of:

signposts transmitting a vote signal having encoded therein the identification of the signpost;

determining those signposts to be in range of the mobile object whose vote signals are received by the mobile object.

3. The method of claim 1 in which the step of determining which signposts are in range of the mobile object further comprises the steps of:

signposts periodically transmitting a vote signal;

determining those signposts to be in range of the mobile object whose vote signals are received by the mobile object in a period having a length equal to the period between vote signals from a signpost.

4. The method of claim 1 in which the step of determining which signposts are in range of the mobile object is further defined as the steps of:

the mobile object transmitting a polling signal;

in response to receiving said polling signal from the mobile object, the signposts transmitting a vote signal having encoded therein the identification of the signpost;

the mobile object receiving said vote signals; and determining those signposts to be in range of the mobile object whose vote signals were received by the mobile object in a period following said polling signal from the mobile object.

5. The method of claim 1 in which the step of determining which signposts are in range of the mobile object is further defined as the steps of:

a mobile object transmitting a polling signal to mark the beginning of a polling period of that mobile object;

in response to receiving said polling signal from a first mobile object, each signpost determining whether a vote is already scheduled by the signpost;

in response to a signpost determining that a vote is not already scheduled, said signpost scheduling a vote at a chosen time, said chosen time satisfying a first constraint to not be within the polling period of any second mobile object whose polling signal was previously received by the signpost, and satisfying a second constraint to be within the polling period of said first mobile object, and satisfying a third constraint to be statistically chosen from the set of all times that meet said first and second constraints;

each signpost transmitting a vote signal when a vote scheduled by said signpost comes due;

mobile objects receiving said vote signals; and determining those signposts to be in range of the mobile object whose vote signals were received by the mobile object in said polling period of the mobile object.

6. The method of claim 5 in which the step of a signpost scheduling a vote further comprises the steps of:

in response to a signpost determining that a vote is not already scheduled, said signpost calculating an earliest vote time either equal to the time of receipt of said polling signal or equal to the time of receipt of a prior polling signal plus the length of said polling period, whichever is later, said prior polling signal having been received before said polling signal;

determining whether said earliest vote time is greater than a last vote time equal to the time of receipt of said polling signal plus the length of said polling period minus the expected delay from the time a signal is ready to be transmitted until the signal can be received;

responsive to determing that said earliest vote time is greater than said last vote time, scheduling a vote at said earliest vote time; and responsive to determing that said earliest vote time is not greater than said last vote time, scheduling a vote at a time chosen statistically from the interval that starts at said earliest vote time and that ends at said last vote time.

7. The method of claim 1 in which the step of determining which signposts are in range of the mobile object further comprises the steps of:

the mobile object transmitting a signal; and determining those signposts to be in range of the mobile object that receive said signal.

8. A method of determining a location of a mobile object within a monitored area using many signposts positioned in subareas of the monitored area wherein each signpost transmits a vote signal, wherein at least two signposts are positioned in a same subarea and transmit a same vote signal, and wherein each mobile object is capable of receiving said vote signals, the method comprising the steps of:

encoding in said vote signal of each said signpost a subarea code identifying the subarea the signpost is positioned in;

detecting the subarea code encoded in the vote signals received at the mobile object;

for each subarea code for which a vote signal having that subarea code encoded therein was received at a mobile object, counting a number of vote signals received at the mobile object and having that subarea code encoded therein; and determining the location of the mobile object as being within one of the subareas having the maximum said number of vote signals.

9. The method of claim 8 wherein each signpost periodically transmits a vote signal, wherein the time between transmissions of a vote signal from a signpost has a first period, and wherein the step of counting the number of vote signals is further characterized as:

for each subarea code for which a vote signal having that subarea code encoded therein was received at the mobile object, counting the number of vote signals having that subarea code encoded therein and received at the mobile object during a second period equal in duration to said first period.

10. A method of determining a location of mobile objects within a monitored area using many signposts positioned in subareas of the monitored area wherein each signpost is capable of transmitting a vote signal and wherein each mobile object is capable of receiving the vote signals, and wherein each mobile object is capable of transmitting a polling signal and wherein each signpost is capable of receiving the polling signals, the method comprising the steps of:

transmitting from the mobile object a polling signal;

in response to receiving a first polling signal at a signpost, transmitting from the signpost a vote signal having encoded therein a subarea code identifying the subarea the signpost is positioned in;

in response to receiving a vote signal at a mobile object, detecting the subarea code encoded within the vote signal;

for each subarea code, counting a number of vote signals having that subarea code and received at the mobile object in a mobile object polling period that starts at the time of transmission of said polling signal and that ends a predetermined duration thereafter; and determining the location of the mobile object as being within one of the subareas with the maximum said number of vote signals.

11. The method of claim 10 wherein the step in response to receiving a first polling signal at a signpost is further characterized as the steps of:

in response to receiving a first polling signal at a signpost, determining whether the signpost is scheduled to transmit a vote signal;

in response to determining that the signpost is not scheduled to transmit a vote signal, determining whether the signpost received a second polling signal after a first time equal to the time of receipt of the first polling signal minus the duration of a mobile object polling period;

in response to determining that the signpost has not received a second polling signal after said first time, scheduling the signpost to transmit a vote signal at a time chosen from an interval, said interval starting at the time of receipt of said first polling signal, and said interval ending t the time of receipt of said first polling signal plus the duration of said mobile object polling period minus the expected delay from the time a signal is ready to be transmitted until the signal can be received; and in response to determining that the signpost has received a second polling signal after said first time, scheduling the signpost to transmit a vote signal at a time chosen from an interval, said interval starting at the time of receipt of said second polling signal plus the duration of said mobile object polling period, and said interval ending at the later of either the time of receipt of said second polling signal plus the duration of said mobile object polling period or the time of receipt of said first polling signal plus the duration of said mobile object polling period minus the expected delay from the time a signal is ready to be transmitted until the signal can be received;

and wherein the method is further characterized by the step of:

signposts transmitting scheduled vote signals when said scheduled vote signals come due, said vote signals having encoded therein a subarea code identifying the subarea the signpost is positioned in.

* * * * *